(12) United States Patent
Miyoshi

(10) Patent No.: US 11,972,157 B2
(45) Date of Patent: Apr. 30, 2024

(54) PRINTING SYSTEM INCLUDING A PRINTING SERVICE SYSTEM AND PRINTING CONTROL METHOD

(71) Applicant: CANON KABUSHIKI KAISHA, Tokyo (JP)

(72) Inventor: Tomoya Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/304,547

(22) Filed: Apr. 21, 2023

(65) Prior Publication Data
US 2023/0409255 A1 Dec. 21, 2023

(30) Foreign Application Priority Data

Jun. 9, 2022 (JP) ................. 2022-093820

(51) Int. Cl.
*G06F 3/12* (2006.01)
(52) U.S. Cl.
CPC .......... *G06F 3/1222* (2013.01); *G06F 3/1238* (2013.01); *G06F 3/126* (2013.01); *G06F 3/1288* (2013.01)
(58) Field of Classification Search
None
See application file for complete search history.

(56) References Cited

U.S. PATENT DOCUMENTS 8,675,234 B2 3/2014 Sato
9,436,423 B2 9/2016 Doui
2004/0196491 A1* 10/2004 Uchino ................. G06F 3/1222
358/1.15
2006/0192985 A1* 8/2006 Shen ..................... G06F 3/1208
358/1.15
2008/0313634 A1 12/2008 Matsueda
(Continued)

FOREIGN PATENT DOCUMENTS

JP 2012133489 A 7/2012
JP 2015001787 A 1/2015
JP 2015022636 A * 2/2015

OTHER PUBLICATIONS

English translation of JP-2015022636-A. (Year: 2015).*
(Continued)

*Primary Examiner* — Thomas D Lee
(74) *Attorney, Agent, or Firm* — ROSSI, KIMMS & McDOWELL LLP

(57) ABSTRACT

A printing system comprises a printing apparatus, a printing service, and an information processing apparatus. The printing service registers the printing apparatus and stores a print job received from the information processing apparatus. The information processing apparatus transmits, to the printing service, a print job of a logged-in user in which a printing apparatus is designated. The printing apparatus stores a user of the printing service in association with a user of the printing apparatus, fetches a print job of a user associated with a logged-in user stored in the printing service, and executes printing. A guest user of the printing service is associated with a guest user of the printing apparatus, and the printing apparatus does not execute printing for a print job of the guest user for which a password has not been set.

19 Claims, 16 Drawing Sheets

(56) References Cited

U.S. PATENT DOCUMENTS

| | | |
|---|---|---|
| 2014/0002847 A1* | 1/2014 | Mizuno .............. G06K 15/4095 |
| | | 358/1.14 |
| 2014/0320883 A1 | 10/2014 | Ichida |
| 2014/0337445 A1 | 11/2014 | Nishida |
| 2015/0172267 A1 | 6/2015 | Sato |
| 2016/0004483 A1 | 1/2016 | Yamakawa |
| 2020/0183628 A1 | 6/2020 | Boo et al. |
| 2021/0165616 A1 | 6/2021 | Yasuda |

OTHER PUBLICATIONS

Miyoshi. Copending U.S. Appl. No. 18/304,495, filed Apr. 21, 2023.
Notice of Allowance issued in U.S. Appl. No. 18/304,495, dated Oct. 16, 2023.
Extended European Search Report issued in European Appln. No. 23169111.4 dated Oct. 23, 2023.
Extended European Search Report issued in European Appln. No. 23169113.0 dated Oct. 25, 2023.

* cited by examiner

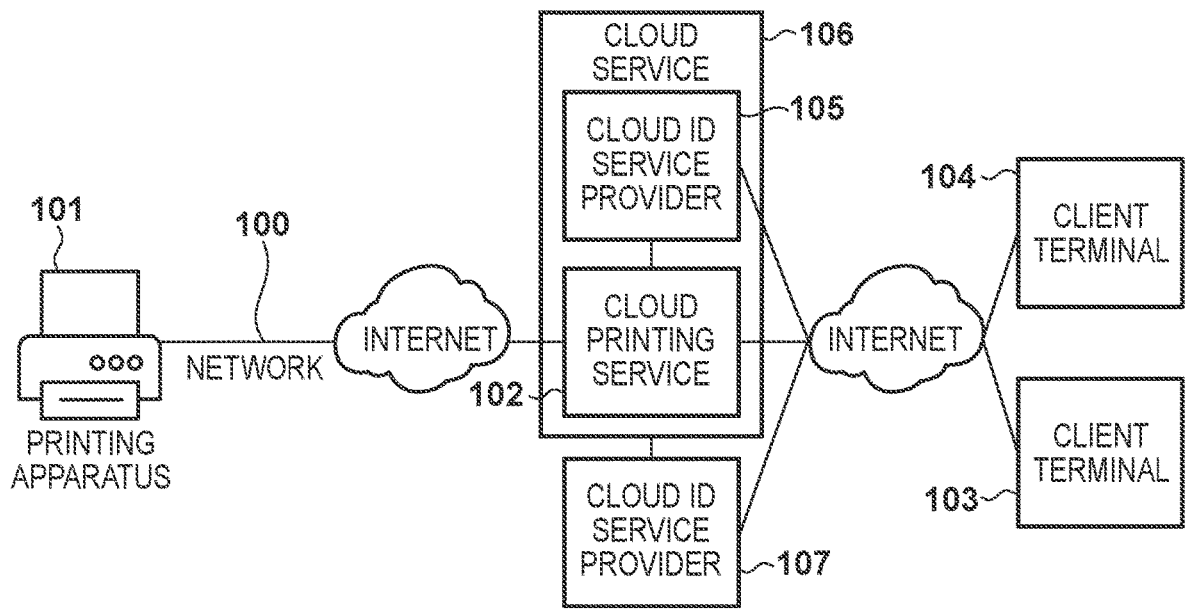

USER LIST REGISTERED IN CLOUD PRINTING SERVICE

| ACCOUNT | USER NAME | USER TYPE | PRINTING SERVICE USAGE |
|---|---|---|---|
| userA@hicrosoft.com | userA | REGULAR | ALLOWED |
| userB@hicrosoft.com | userB | REGULAR | ALLOWED |
| guestA@poogle.com | guestA | GUEST | ALLOWED |
| guestB@conon.com | guestB | GUEST | ALLOWED |

FIG. 2B

USER LIST REGISTERED IN PRINTING APPARATUS

| USER NAME | CLOUD ACCOUNT |
|---|---|
| userA | userA@hicrosoft.com |
| userB | userB@hicrosoft.com |

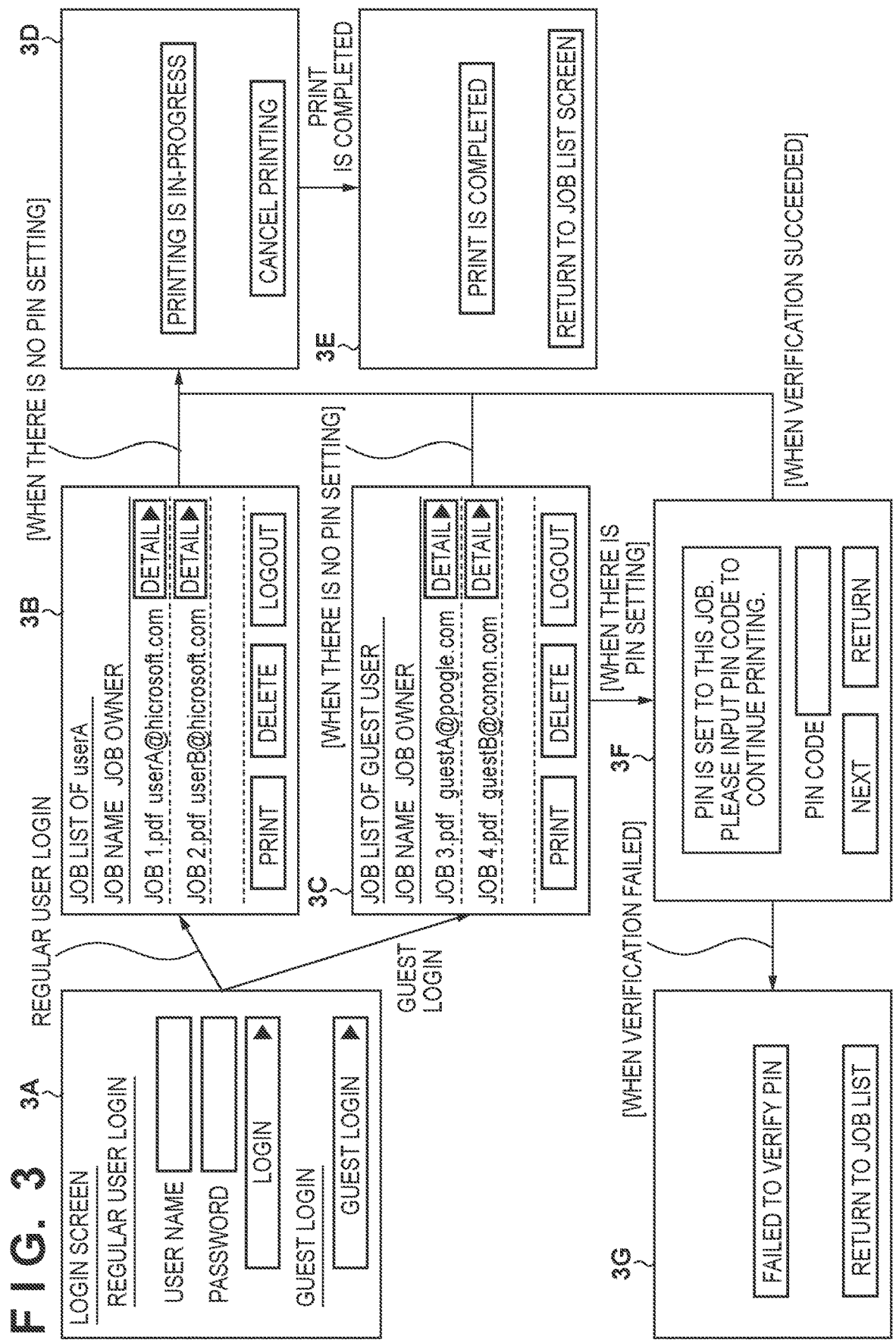

FIG. 6A

```
JOB FETCH REQUEST PACKET

Operation : Fetch-Job Request
Attribute:
  job-id=1
```

FIG. 6B

```
JOB FETCH RESPONSE PACKET (FOR REGULAR USER)

Operation : Fetch-Job Response
Status code : successful-ok
Attribute:
  job-id = 1
  job-uuid = urn:uuidce027bf-4d49-32c3-47db-054116c684fb
  job-name = test.pdf
  job-originating-user-name : userA
  job-originating-user-uri : userA@hicrosoft.com
  copies = 1
  number-up = 1
  color-mode = color
```

FIG. 6C

```
JOB FETCH RESPONSE PACKET
(FOR GUEST USER AND THERE IS NOT PIN)

Operation : Fetch-Job Response
Status code : successful-ok
Attribute:
  job-id = 1
  job-uuid = urn:uuidce027bf-4d49-32c3-47db-054116c684fb
  job-name = test.pdf
  job-originating-user-name : guestA
  job-originating-user-uri : guestA@google.com
  copies = 1
  number-up = 1
  color-mode = color
```

FIG. 6D

```
JOB FETCH RESPONSE PACKET
(FOR GUEST USER AND THERE IS PIN)
Operation : Fetch-Job Response
Status code : successful-ok
Attribute:
  job-id = 1
  job-uuid = urn:uuidce027bf-4d49-32c3-47db-054116c684fb
  job-name = test.pdf
  job-originating-user-name : guestA
  job-originating-user-uri : guestA@google.com
  copies = 1
  number-up = 1
  color-mode = color
  job-password = asv23ac34
  job-password-encryption = sha2-256
```

FIG. 6E

```
JOB STATUS SUCCESSFUL PACKET

Operation : Update-job-states
Status code : successful-ok
Attribute:
  job-id = 1
  job-uuid = urn:uuidce027bf-4d49-32c3-47db-054116c684fb
  output-device-job-state = pending-held
```

FIG. 6F

```
JOB STATUS ERROR PACKET

Operation : Update-job-states
Status code : successful-ok
Attribute:
  job-id = 1
  job-uuid = urn:uuidce027bf-4d49-32c3-47db-054116c684fb
  output-device-job-state = canceled
  output-device-job-state-message = job-permission-error
  output-device-job-reasons = cancel-job
```

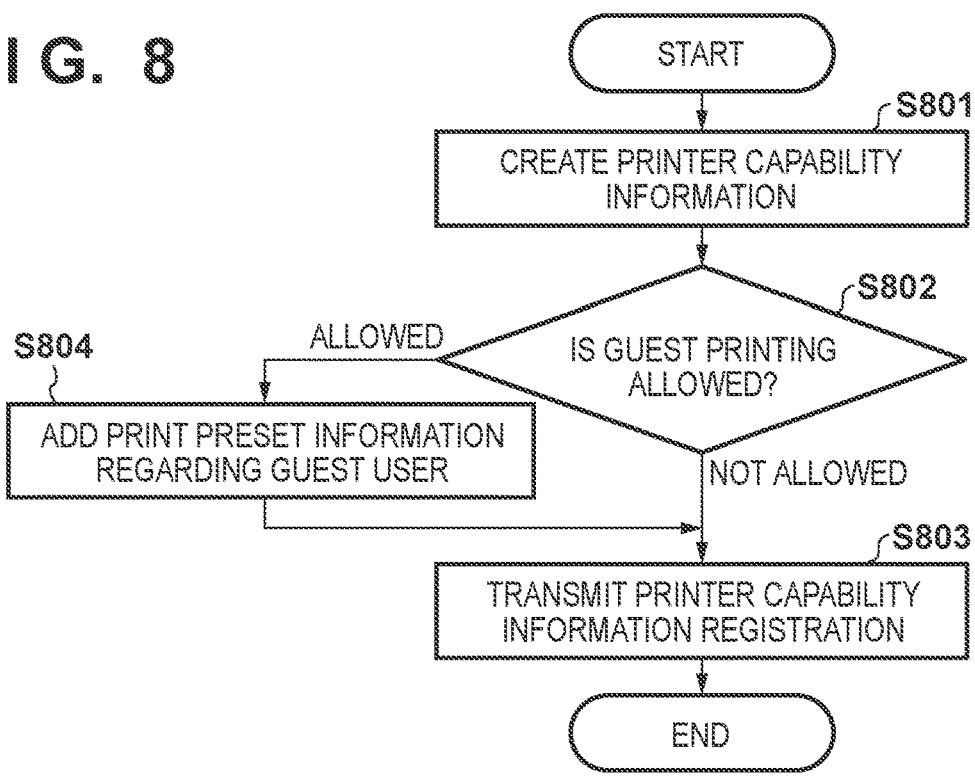

FIG. 8

FIG. 9A  PRINTER CAPABILITY REGISTRATION PACKET
(WHEN GUEST PRINTING IS NOT ALLOWED)

Ooeration : Update-Output-Device-Attributes
Printer-Description-Attribute:
 Copies-supported = 1-999
 number-up-supported = 1,2,4,8
 sides-supported = true

FIG. 9B  PRINTER CAPABILITY REGISTRATION PACKET
(WHEN GUEST PRINTING IS ALLOWED)

Ooeration : Update-Output-Device-Attributes
Printer-Description-Attribute:
 Copies-supported = 1-999
 number-up-supported = 1,2,4,8
 sides-supported = true
 job-presets-supported {
   preset-name = "preset1";
   job-password-encryption = sha2-256;
   job-account-type = guest;
 }

FIG. 12

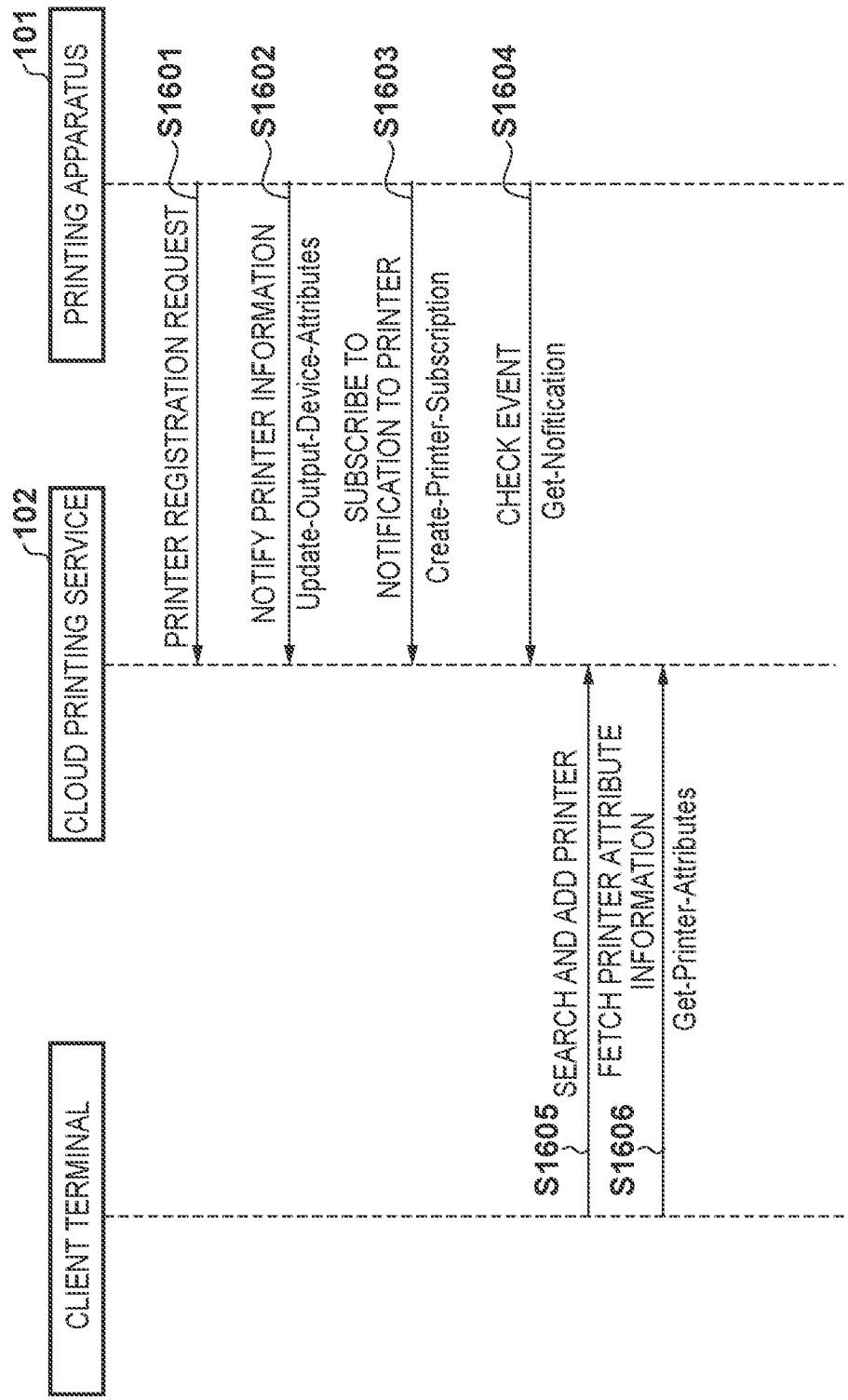

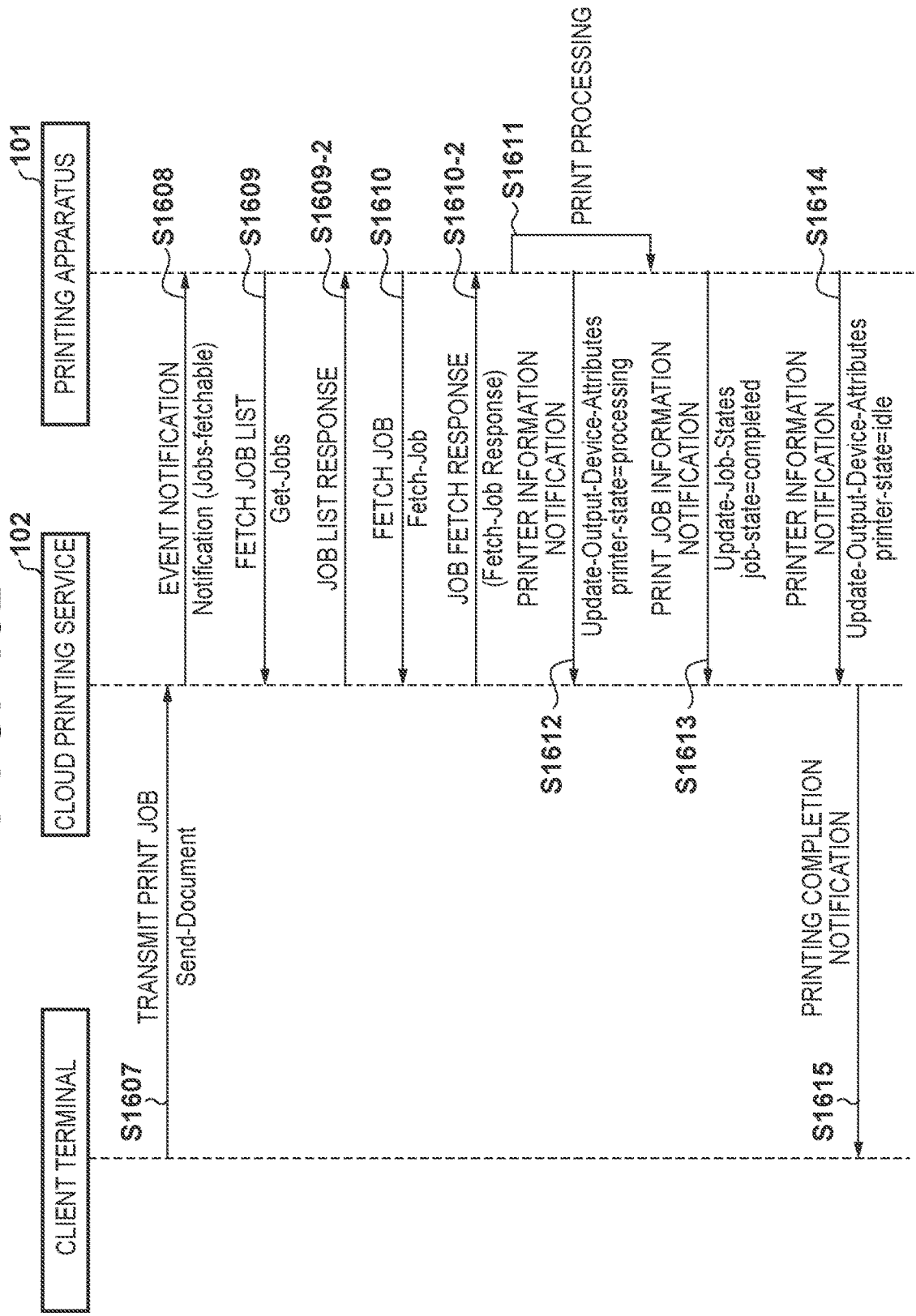

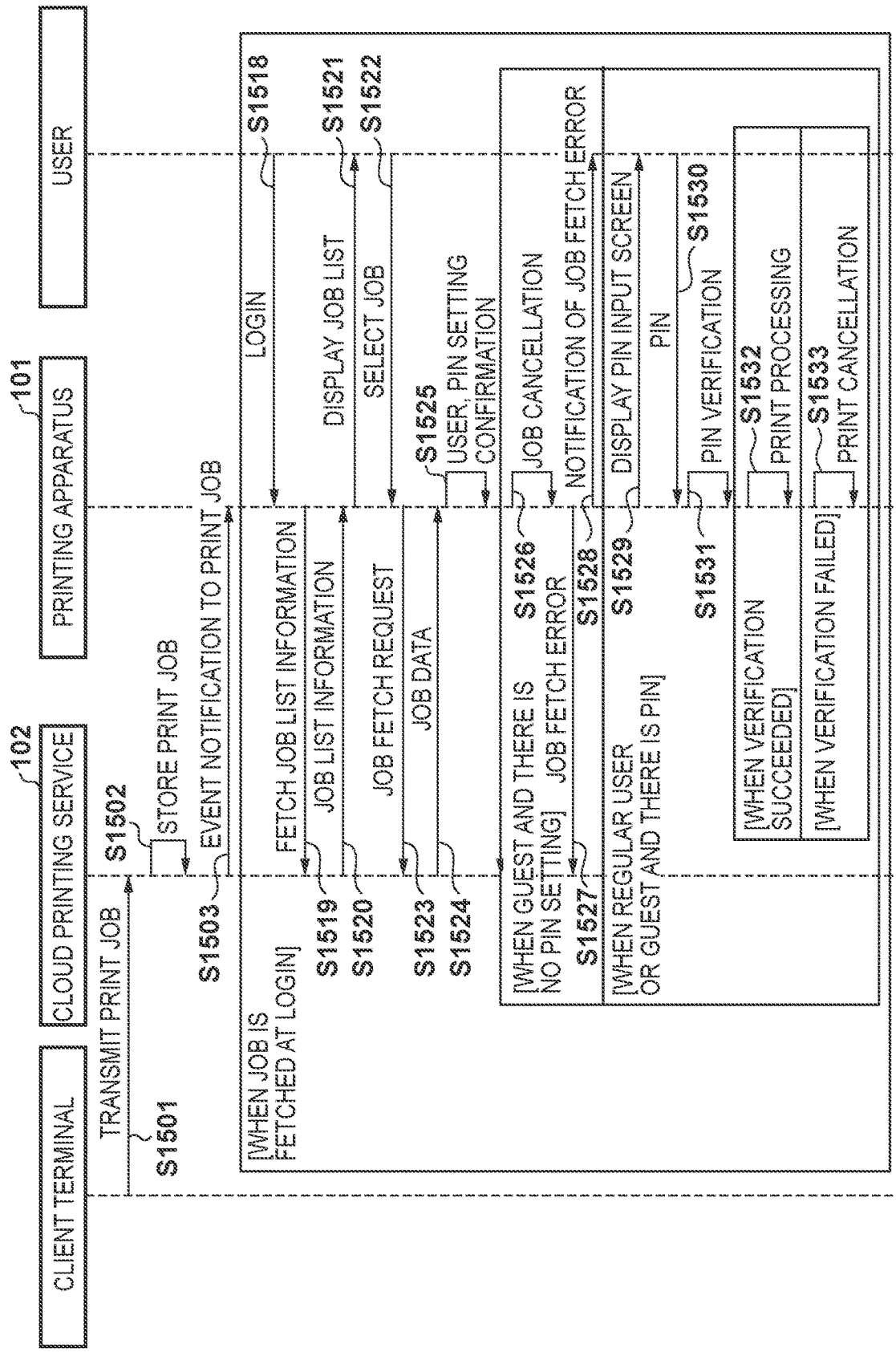

PRINTING SYSTEM INCLUDING A PRINTING SERVICE SYSTEM AND PRINTING CONTROL METHOD

BACKGROUND OF THE INVENTION

Field of the Invention

The present invention relates to a printing system and a printing control method.

Description of the Related Art

A user management function may be validated in a printing apparatus that is installed in an organization, a company, or the like and assumed to be used by a plurality of users. In this case, a mechanism is available in which users who belong to the organization, company, or the like log in to the printing apparatus to use various functions of this printing apparatus. There is also a mechanism in which a user who does not belong to the organization, company, or the like can log in to a guest account and is allowed to submit a job to the printing apparatus while satisfying set constraints (Japanese Patent Laid-Open No. 2015-1787).

In recent years, the mechanism of cloud printing, in which a print job is submitted via a cloud and transmitted to a printing apparatus, has begun to be widely used (Japanese Patent Laid-Open No. 2012-133489). In this type of printing system, first, an administrator registers a printing apparatus to a cloud printing service (hereinafter also referred to as "CPS") to which the administrator belongs. Thereafter, users who are permitted to use the CPS use respective client terminals to select a printer registered in the CPS as an output printer, configure desired print settings, and transmit a print job to the CPS. The CPS that has received a print job transfers this print job to the selected printing apparatus. The printing apparatus executes printing based on the transferred print job. Particularly, the mechanism of cloud printing that uses IPP (Internet Printer Protocol) is defined by PWG5100.18, RFC3995, RFC3996, and other relevant specifications.

Some cloud service provides a mechanism in which a user who has not been registered in a cloud service is temporarily permitted to use this cloud service. For example, an administrator of a CPS can permit a specific guest user who has not been registered as a user to use the CPS. The CPS may permit the guest user to use cloud printing, for example. Meanwhile, some printing apparatus allows a guest user to log in to and use the printing apparatus.

When a guest user of this type of CPS selects a printing apparatus and executes printing on the CPS, and the printing apparatus fetches the print job from the CPS and stores the fetched print job, the user (i.e. owner) who submitted the print job cannot be associated with a registered user of the printing apparatus. In this case, the printing apparatus treats the fetched print job as a print job of the guest user. If a plurality of guest users of the CPS execute printing on the CPS, there is a problem in that the guest users of the printing apparatus can reference all of these print jobs as print jobs of guest users, and can also execute printing.

SUMMARY OF THE INVENTION

The present invention provides a mechanism that ensures security of print jobs of guest users as well.

To achieve at least one of the above objects, the present invention has the following configuration. The present invention in its first aspect provides a printing system comprising: a printing apparatus comprising at least one memory storing at least one first program, and at least one first processor; a printing service system connected to the printing apparatus, the printing service system comprising at least one memory storing at least one second program, and at least one second processor; and an information processing apparatus connected to the printing service system, the information processing apparatus comprising at least one memory storing at least one third program, and at least one third processor, the at least second program causes the printing service system, when executed by the at least second processor, to perform: registering the printing apparatus; and storing a print job received from the information processing apparatus, the at least third program causes the information processing apparatus, when executed by the at least third processor, to perform: transmitting, to the printing service system, a print job of a logged-in user in which a printing apparatus selected from among at least one printing apparatus registered in the printing service system is designated, the at least first program causes the printing apparatus, when executed by the at least first processor, to perform: storing a user of the printing service system in association with a user of the printing apparatus; and fetching a print job of a user associated with a logged-in user of the printing apparatus, out of at least one print job stored in the printing service system, and printing, wherein a guest user of the printing service system is associated with a guest user of the printing apparatus, and the printing apparatus does not execute printing for a print job of the guest user for which a password has not been set.

The present invention in its second aspect provides a printing control method to be performed by a printing system that includes a printing apparatus, a printing service system connected to the printing apparatus, and an information processing apparatus connected to the printing service system, the method comprising: registering the printing apparatus and storing a print job received from the information processing apparatus, using the printing service system; transmitting, to the printing service system, a print job of a logged-in user in which a printing apparatus selected from among at least one printing apparatus registered in the printing service system is designated, using the information processing apparatus; and registering a user of the printing service system in association with a user of the printing apparatus, fetching a print job of a user associated with a logged-in user of the printing apparatus from among at least one print job stored in the printing service system, and executing printing, using the printing apparatus, wherein a guest user of the printing service system is associated with a guest user of the printing apparatus, and printing is not executed using the printing apparatus for a print job the guest user for which a password has not been set.

According to the present invention, security can be ensured for print jobs of guest users as well.

Further features of the present invention will become apparent from the following description of exemplary embodiments with reference to the attached drawings.

BRIEF DESCRIPTION OF THE DRAWINGS

FIG. 1 shows an example of a printing system.
FIGS. 2A and 2B illustrate user account lists.
FIG. 3 shows examples of an operation screen of a printing apparatus.

FIGS. 6A to 6F show examples of packets when a print job is received in the first embodiment.

FIG. 8 shows an example of a flowchart for registering printer capability information in a third embodiment.

FIGS. 9A and 9B show examples of packets for registering printer capability information in the third embodiment.

FIG. 12 shows examples of print setting screens in the fourth embodiment.

FIG. 13A shows an example of a sequence (printing apparatus registration) in cloud printing using IPP.

FIG. 13B shows an example of a sequence (printing) in cloud printing using IPP.

FIG. 15B shows an example of a sequence of print job fetch in the second embodiment.

DESCRIPTION OF THE EMBODIMENTS

Figure 4:
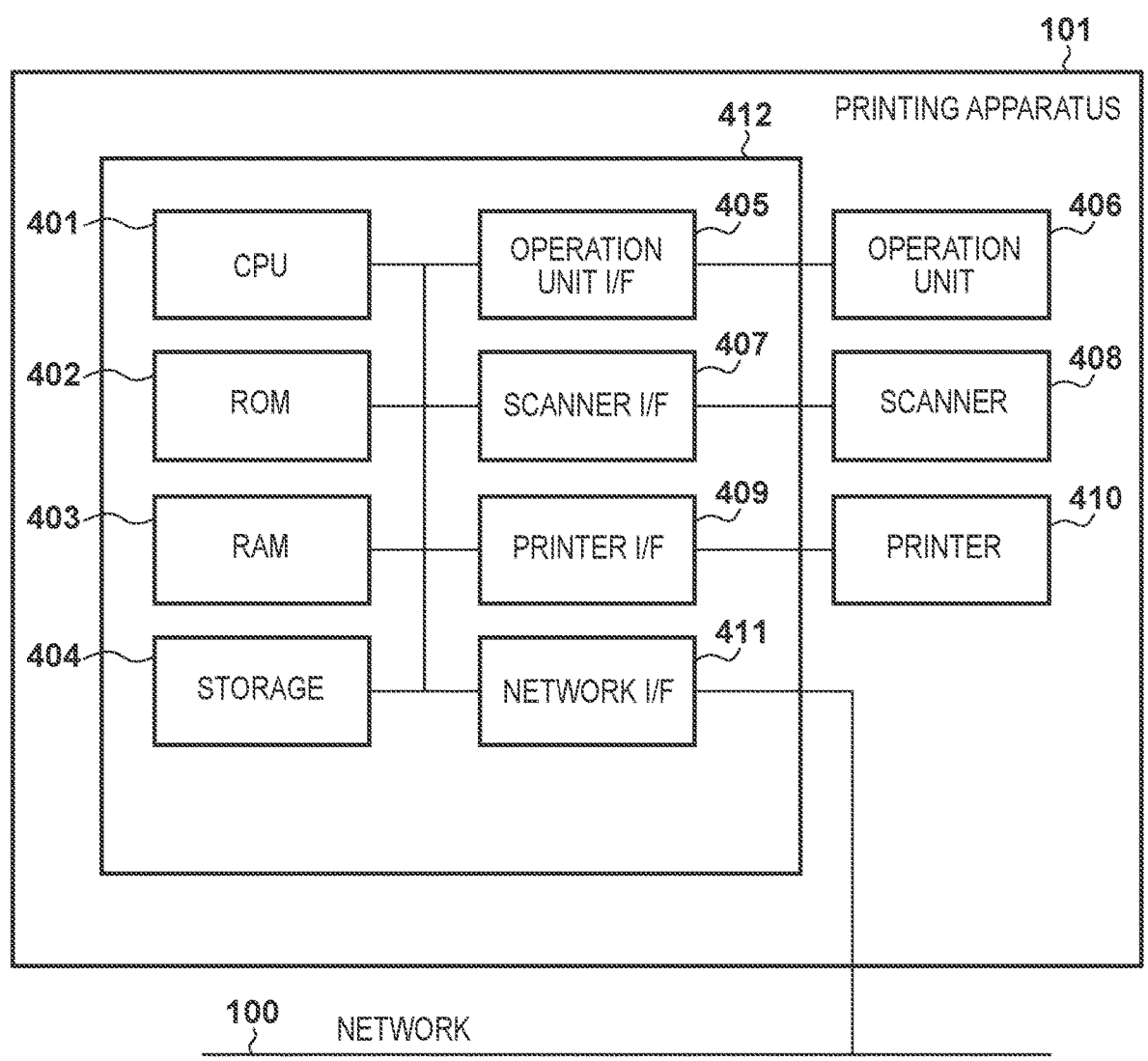
FIG. 4 shows an example of a hardware configuration of the printing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

First, a configuration of a printing system according to the present invention will be described with reference to FIG. 1. The printing system according to the present embodiment includes a printing apparatus 101, client terminals 103 and 104, a cloud printing service (hereinafter, "CPS") 102, a cloud ID service provider 105, and a cloud ID service provider 107. Here, the CPS 102 and the cloud ID service provider 105 are cloud services 106 provided by the same company, and the CPS 102 can be used with accounts managed by the cloud ID service provider 105. Note that the CPS 102 is also called a printing service system.

Meanwhile, the cloud ID service provider 107 is a service provided by a company different from the company of the cloud services 106. Users who have accounts on the cloud ID service provider 107 can use, with these accounts, the CPS 102 as guest users by using an account linking service, such as OAUTH. The printing apparatus 101 communicates with the CPS 102 on the internet via a network 100. For example, the network 100 may be a combination a communication network such as a LAN or a WAN, a cellular network (e.g. LTE, 5G etc.) and/or a wireless network conforming to IEEE802.11. That is, the network 100 need only be a network that enables transmission and reception of data, and may employ any physical-layer communication method.

The printing apparatus 101 has a scan function of transmitting data based on an image that is read using a scanner to an external device, a print function of printing an image on a sheet, such as paper, based on a print job received from an external device, and a copy function. The printing apparatus 101 can also receive a print job via the CPS 102 and perform printing. The present embodiment illustrates an MFP (Multi-Function Peripheral) that has a plurality of functions as an example of a printing apparatus, but the printing apparatus is not limited thereto. For example, the printing apparatus may be an SFP (Single-Function Peripheral) that only has a print function as its single function. Also, the present embodiment illustrates, as an example, printing on a sheet such as paper. However, the present invention is not limited thereto, and can also be applied to printing control in, for example, 3D printing for forming a three-dimensional object based on three-dimensional shape data. Note that the printing apparatus is also referred to as an image forming apparatus in some cases.

The printing apparatus 101 of this embodiment has a user management function. User information is registered in advance to the printing apparatus 101, and the printing apparatus 101 provides function restrictions that limit functions to be used by users, and a log-in function that allows users to log in to and use the printing apparatus 101.

The CPS 102 receives a print job from a client terminal, such as the client terminal 103 or 104, and stores the print job. Next, the CPS 102 notifies the printing apparatus 101, which has been registered in the CPS 102, that a print job has been submitted. The printing apparatus 101 that has received the notification fetches the print job and executes print processing. The CPS 102 may be constituted by one or more information processing apparatuses. If the CPS 102 is constituted by a plurality of information processing apparatuses, functions such as user authentication and print data provision may be distributed, or the load of one function may be distributed, or a combination of these modes may be applied.

Hardware Configuration of Printing Apparatus 101

A hardware configuration of the printing apparatus 101 of the present embodiment will be described with reference to FIG. 4. FIG. 4 is a block diagram showing the hardware configuration of the printing apparatus 101. The printing apparatus 101 has functions such as a readout function of reading an image on a sheet and a file transmission function of transmitting the read image to an external communication device. The printing apparatus 101 also has a print function of printing an image on a sheet. The printing apparatus 101 also has a function of receiving a print job from the CPS 102 and performing printing, a user management function, and a hold print function.

A CPU (Central Processing Unit) 401 controls operation of the entire printing apparatus 101. The CPU 401 loads and executes control programs stored in a ROM (Read Only Memory) 402 or a storage 404 and performs various types of control, such as print control and readout control. Control programs that can be executed by the CPU 401 are stored in the ROM 402. A RAM (Random Access Memory) 403 is a main storage memory accessed by the CPU 401 and is used as a work area or a temporary storage area for loading various control programs. Print jobs, image data, various programs, and various types of setting information are stored in the storage 404. Print jobs and other information downloaded from the CPS 102 are also stored in the storage 404. Hardware such as the CPU 401, the ROM 402, the RAM 403, and the storage 404 thus constitutes a computer.

Note that one CPU 401 in the printing apparatus 101 of the present embodiment executes various types of processing, which are shown in later-described flowcharts, using one memory (RAM 403), but any other mode may alternatively be employed. For example, the processing shown in the later-described flowcharts can also be executed by cooperation between a plurality of processors, memories, and storages. Further, a part of processing may also be executed using a hardware circuit.

A printer 410 prints an image on a sheet fed from a paper feed cassette (not shown), based on an input print image and a print control command. The printing method may be an electrophotographic method in which toner is transferred and fixed to paper, or may be an inkjet method in which printing is performed by ejecting ink to paper.

A scanner 408 reads an original placed on a platen (not shown) and generates image data. The image data generated by the scanner 408 is printed by the printer 410, stored in the storage 404, and/or transmitted to an external device via a network interface (I/F) 411.

An operation unit 406 includes a liquid-crystal display having a touch panel function, various physical keyboards, and the like. The operation unit 406 functions as a display unit for displaying information for a user and an accepting unit for accepting instructions from the user. That is, the operation unit 406 provides a user interface. The CPU 401 cooperates with the operation unit 406 to control display of information and accepting of user operation.

A network cable is connected to the network I/F 411, which enables communication with external devices on the network 100 and/or the internet. The present embodiment assumes that the network I/F 411 is a communication interface for wired communication conforming to Ethernet (registered trademark), but the network I/F 411 is not limited thereto. For example, the network I/F 411 may alternatively be a wireless communication interface conforming to the IEEE802.11 series. Both may be wireless communication interfaces. Alternatively, a communication interface for mobile communication with, for example, a 3G line such as CDMA, a 4G line such as LTE, or 5G NR may be applied.

The present embodiment illustrates the case where the printing apparatus 101 manages a database for managing user accounts, but the management of user accounts is not limited thereto. User accounts of users who use the printing apparatus 101 can also be managed by also using an external authentication server. For example, user accounts may be managed by using the Active Directory service or the Azure (registered trademark) Active Directory service provided by Microsoft (trademark).

Hardware Configuration of Cloud Printing Service 102

Figure 10:
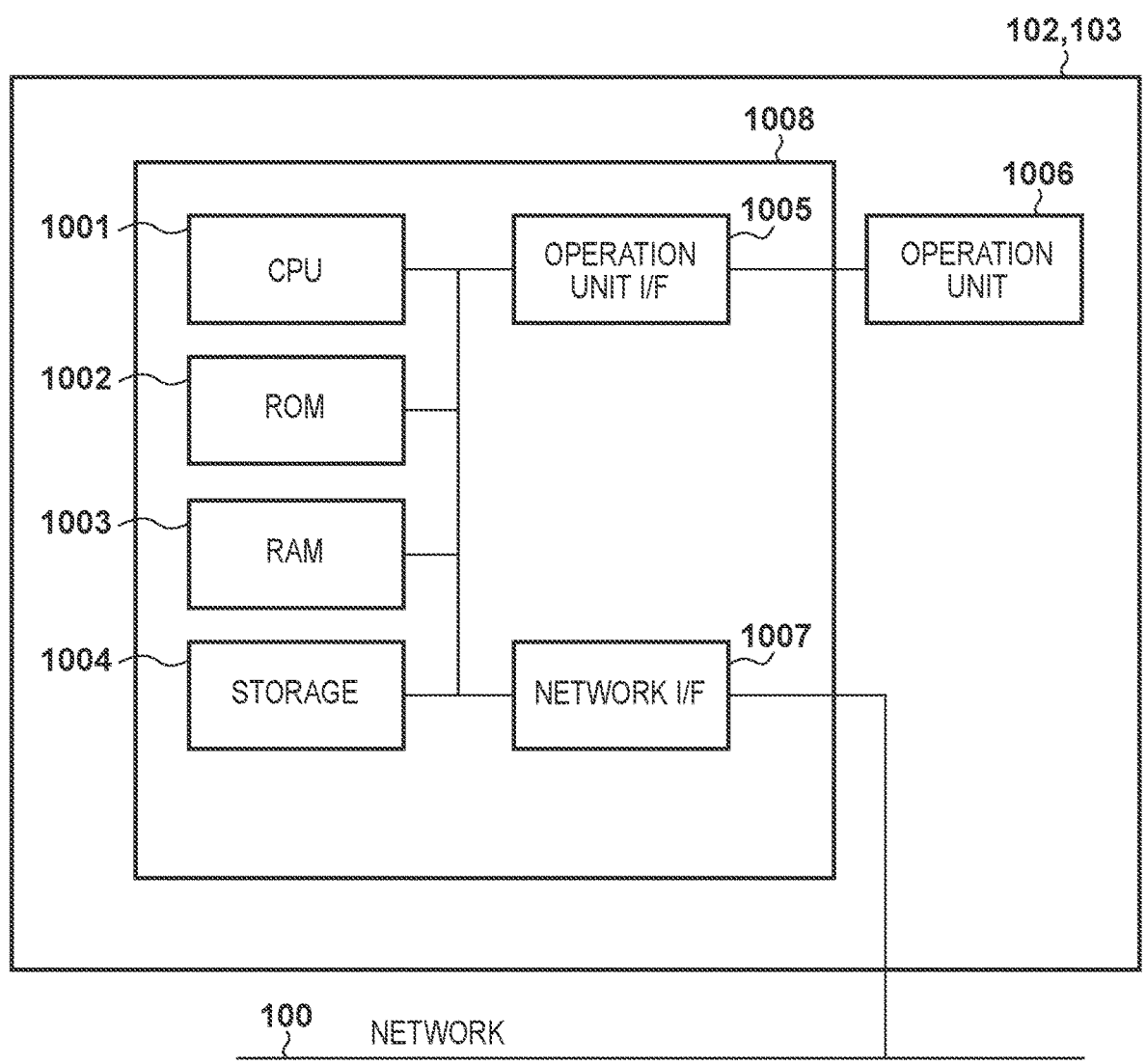
FIG. 10 shows an example of a hardware configuration of a client terminal.

A hardware configuration of the cloud printing service 102 of the present embodiment will be described with reference to FIG. 10. A CPU 1001 to an operation unit 1006 in FIG. 10 correspond respectively to the CPU 401 to the operation unit 406 in FIG. 4, and a network interface 1007 corresponds to the network interface 411. Constituent elements in FIG. 10 are substantially the same as the constituent elements of the printing apparatus in FIG. 4, and a detailed description thereof is omitted. Note that the client terminal also has the same configuration as the configuration shown in FIG. 10. The CPS 102 may also have a plurality of CPUs and memories. In this case, at least one program may be stored in a plurality of memories.

Registration of Print Job

A procedure that enables printing with the printing system having the above configuration of this embodiment will be described. FIG. 13A is an example of a sequence diagram showing a mechanism of cloud printing using IPP, specifically a procedure for registering a printing apparatus and making the registered printing apparatus available from the client terminal.

First, the printing apparatus 101 is operated to transmit a printer registration request to the CPS 102 (S1601). The operation may be performed on the operation unit 206 of the printing apparatus 101, or may be performed using a remote UI provided to a computer or the like by the printing apparatus 101. Thereafter, the printing apparatus 101 notifies the CPS 102 of supported attribute information and attribute values by means of an Update-Output-Device-Attributes operation (S1602). The attribute values of the printing apparatus 101 are thus registered in the CPS 102. The attribute values of the printing apparatus 101 include whether or not PIN printing, which is a print job with a password, is supported, for example.

Thereafter, the printing apparatus subscribes to event notification from the CPS 102 by means of a Create-Printer-Subscription operation (S1603). After subscribing to the notification, the printing apparatus 101 checks whether or not an event has occurred by means of a Get-Notification operation (S1604). The CPS 102 thus notifies the printing apparatus 101 of an event upon occurrence of a new event, such as registration of a print job to be executed by the printing apparatus 101. Addition of a printing apparatus to the CPS 102 through the above procedure need only be performed prior to cloud printing using the printing apparatus 101.

To register a printing apparatus, a user of the CPS 102 is associated with a user of the printing apparatus 101, and user information regarding this user is stored. For example, user information in the CPS 102 may be stored in the printing apparatus 101 in association with user information in the printing apparatus 101. User information may include a user ID and authentication information such as a password, if necessary. User information may be associated on the operation unit of the printing apparatus 101 or from a client terminal using a remote UI of the printing apparatus 101, for example. In any case, it is desirable to permit only an administrator user who has administrator rights to perform the associating operation. Further, user information may be associated after registration of the printing apparatus 101.

Meanwhile, the client terminal 103 searches printing apparatuses registered in the CPS 102, and adds a printing apparatus selected from the found printing apparatuses as a printing apparatus to be used by the client terminal 103 (S1605). The client terminal 103 then fetches, from the CPS 102, attribute information and attribute values of the added printing apparatus by means of a Get-Printer-Attributes operation (S1606). The fetched attribute information and attribute values of the printing apparatus may be stored in association with the registered printing apparatus. Note that attribute information of printing apparatuses also includes a password attribute (PIN attribute), which indicates that a print job with a password, i.e. PIN printing is supported.

Thereafter, when executing printing, the client terminal 103 can select the printing apparatus added in steps S1605 and S1606 and perform printing using the selected printing apparatus. When printing is performed, if the printing apparatus selected by the client terminal 103 is the printing apparatus 101 registered in the CPS 102, the client terminal 103 displays a print setting screen in accordance with the fetched attribute information and transmits the print job together with set print attributes to the CPS 102. Note that attribute information regarding a printing apparatus is also called print settings in some cases.

Guest Job in Cloud Printing Service

Next, a conventional guest job in a cloud printing service will be described. FIG. 2A shows an example of a list of user accounts registered in the cloud services 106. A user A (UserA) and a user B (UserB) are regular users registered in a cloud ID service provider. An administrator of the cloud service can configure settings to permit or not permit each user to use the CPS 102. The guest user A and the guest user B are users who have not been registered in the cloud services 106, and are users of the other cloud ID service provider 107. Although the guest user A and the guest user B usually do not have the authority to use the CPS 102, here, the administrator of the cloud services 106 has permitted these guest users to use the CPS 102. Thus, the guest user A and the guest user B can use the CPS 102 using their accounts on the cloud ID service provider 107. This type of linkage is realized by means of a service linking technology, such as OAUTH.

Meanwhile, information regarding the user A and the user B has been registered in the printing apparatus 101 as shown in FIG. 2B, and unregistered users are treated as guest users. Registered users of the printing apparatus 101 are associated with registered users of the CPS 102 when, for example, the printing apparatus 101 is registered to the CPS 102. For example, user information regarding registered users of the CPS 102 who are associated with registered users of the printing apparatus 101 are stored in the printing apparatus 101. Thus, after a user of the printing apparatus 101 has logged in to the printing apparatus 101, the user can access the CPS 102 due to the printing apparatus 101 using user information in the CPS 102 that is associated with this user. Users who have not been registered in the CPS 102 are not associated with users of the printing apparatus. Thus, if the guest user A and the guest user B transmit print jobs using the CPS 102, the printing apparatus 101 treats these print jobs of the guest users as print jobs of guest users. To illustrate the problem regarding guest jobs in cloud printing services, printing by a registered user and printing by a guest user will now be described. First, a procedure in a cloud printer will be described.

Example of Cloud Printing Procedure

FIG. 13B shows an example of a procedure for executing cloud printing after the registration of the printing apparatus in FIG. 13A. This procedure is also carried out conforming to IPP. The client terminal 103 displays a print setting screen in accordance with the fetched attribute information and attribute values, and transmits, to the CPS 102, a print job in accordance with print attributes designated by the user (S1607). The print job is transmitted using any of the operations to transmit a print job, such as a Send-Document operation, a Print-Job operation, or a Create-Job operation.

The CPS transmits an event notification that a job has been submitted, to the printing apparatus 101 (S1608). The printing apparatus 101 that has received the event notification makes a request for job list information to the CPS 102 using a Get-Jobs operation (S1609), and fetches job list information from the CPS 102 (S1609-2). Further, the printing apparatus 101 makes, to the CPS 102, a request for job data and attribute values selected from the fetched job list using a Fetch-Job operation (S1610), and fetches the job from a response to the request (S1610-2).

The printing apparatus 101 executes print processing in accordance with the fetched job data and attribute values (S1611). The printing apparatus 101 then transmits, to the CPS 102, a printer information notification using an Update-Output-Device-Attributes operation depending on the processing status of the job (S1612, S1614). The printing apparatus 101 also transmits a job information notification to the CPS 102 using an Update-Job-Status operation (S1613). After the print processing has been completed, the CPS 102 also gives the client terminal a printing completion notification (S1615).

Note that the CPS (cloud printing service) herein refers to a service capable of communication with client terminals and printers by means of the internet, receiving print requests using IPP, and providing print jobs. A description will now be given to the case where a registered user performs printing through this procedure without using the PIN print function. In PIN printing, a PIN (Personal ID Number; i.e. a password) is set for a print job to be transmitted to the CPS 102. To execute this print job with the printing apparatus 101, the user is required to input the password, and printing is executed if the input password is checked with the set password and these passwords match.

A job information fetch request packet shown in FIG. 6A is a request for a print job whose job ID=1. If this print job is a print job of a registered user, a job fetch response packet is a packet such as an example shown in FIG. 6B. FIG. 6B shows an example of a job fetch response packet received by the printing apparatus 101 in step S1610-2 in FIG. 13B. This is an example where the user A has submitted a print job, and tenant information indicating that the account of the user A is of the cloud ID service provider 105 is held in "Job-originating-user-uri". The printing apparatus 101 can thus determine that this print job is from a registered user. Accordingly, if the user A logs in to the printing apparatus 101, the printing apparatus 101 can perform control such that only jobs submitted by the user A are displayed, as in a job list screen 3B in FIG. 3. In the following description, a user of the CPS and a user of the printing apparatus who are associated with each other are the same user, for convenience of description. However, user IDs of these users may be different as long as they are associated with each other.

Next, printing by a guest user will be described. A packet of a print job of a guest user is a packet such as an example shown in an example in FIG. 6C. In the following example, a user whose user name is "guestA" uses an account on the cloud ID service provider 107 that is "guestA@google.com". The printing apparatus 101 determines that this print job is from an account that has not been registered in the printing apparatus 101, and the fetched print job is stored as a guest user job in the printing apparatus 101.

For a user to log in as a guest user to the printing apparatus 101, a button or the like for the user to log in as a guest user is provided in a log-in screen displayed on the operation unit 406, for example. The user who wants to log in as a guest user logs in as a guest user by touching this button. Thus, if a user whose user name is guestA logs in as a guest user to the printing apparatus 101, print jobs of all guest users including not only guestA but also guestB are displayed, as shown in a print job list screen 3C in FIG. 3. This allows the guest user to select a print job of guestB, which is not the guest user's own job, and execute printing.

As described above, if a plurality of guest users execute printing with the CPS, a guest user who logs in to the print job 101 is allowed to reference print jobs of all guest users and execute printing of these print jobs.

Sequence of Transmitting and Receiving Print Job in First Embodiment

Figure 5:
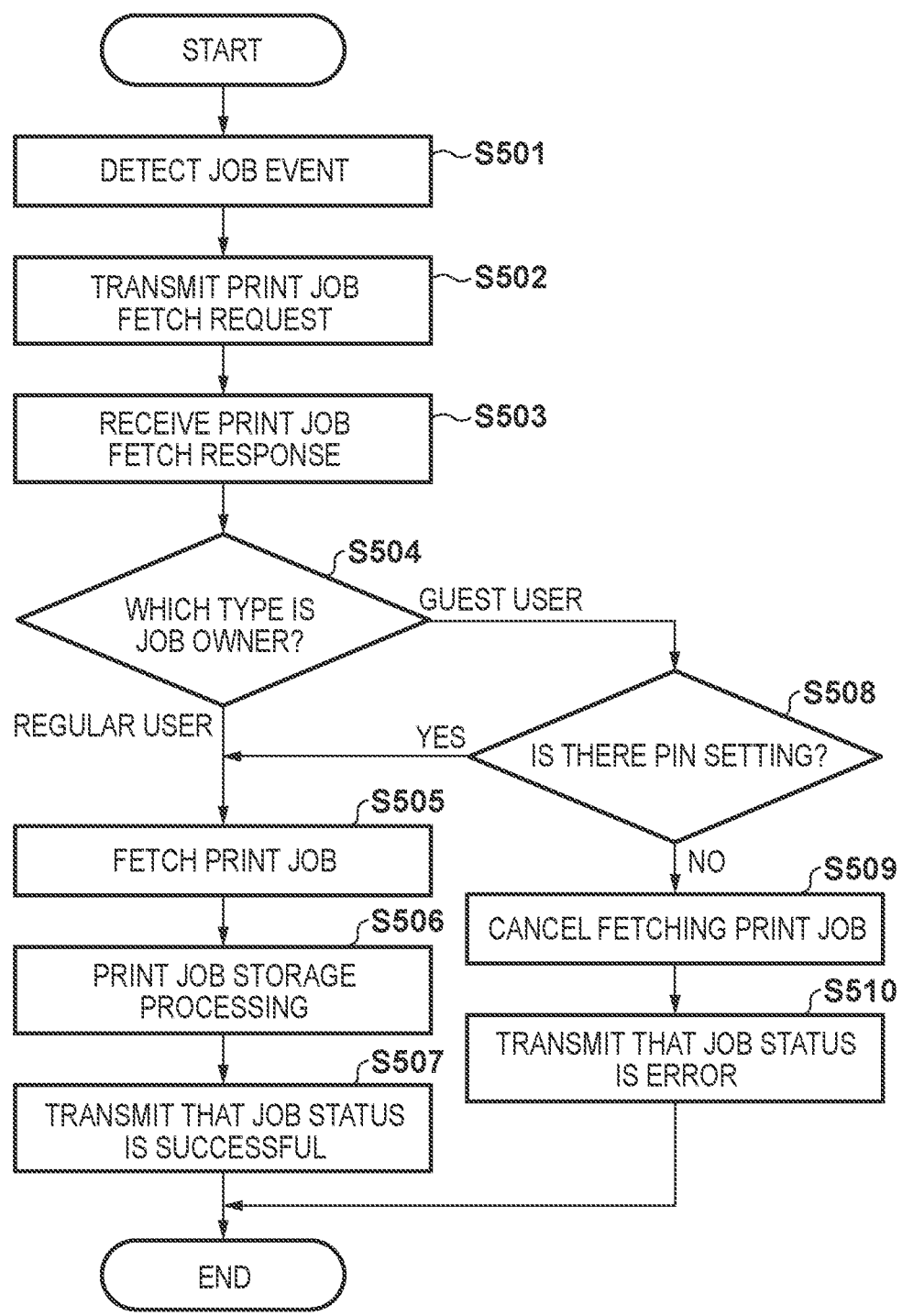
FIG. 5 shows an example of a flowchart when a print job is fetched in a first embodiment.
Figure 15A:
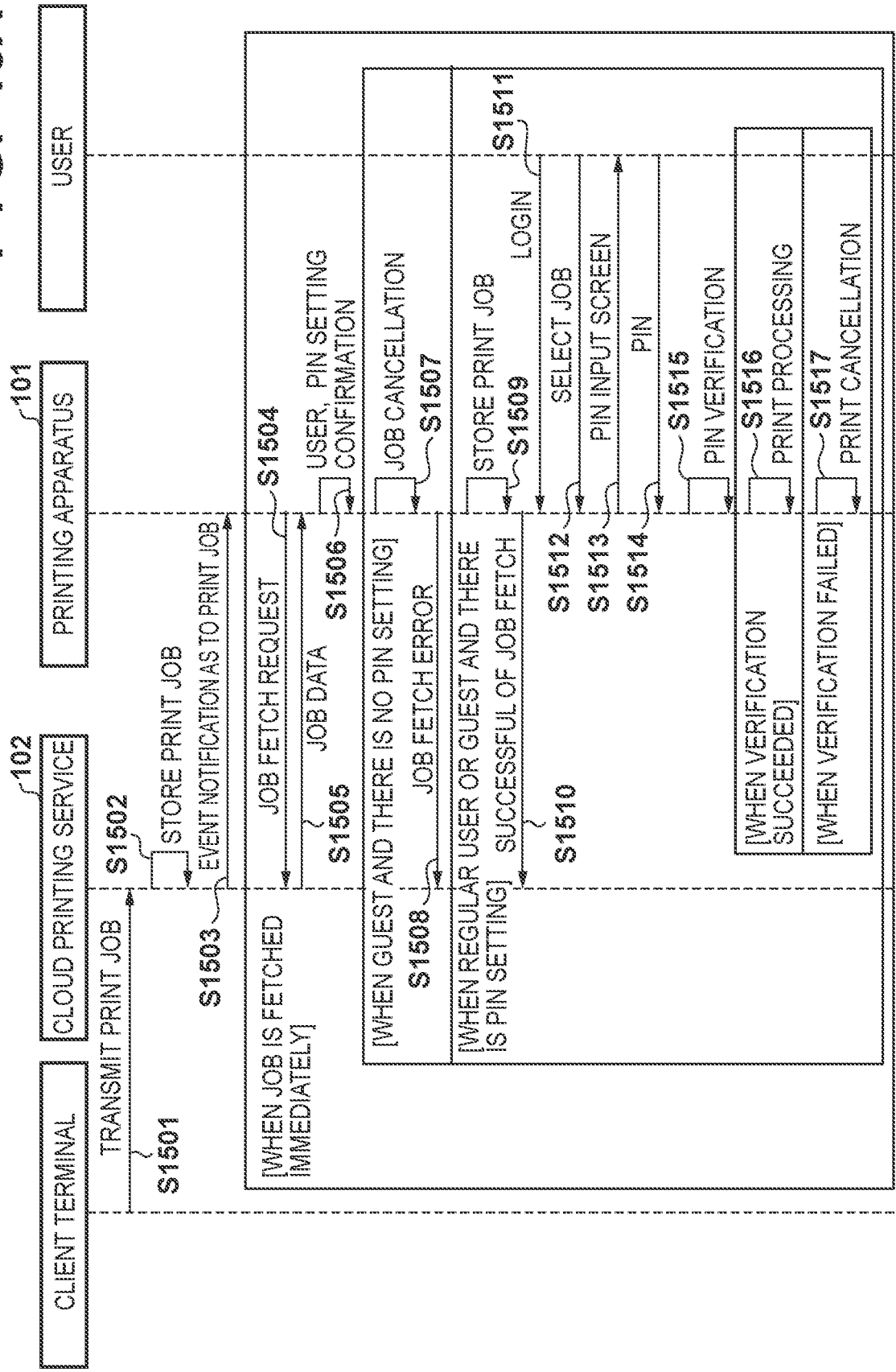
FIG. 15A shows an example of a sequence of print job fetch in the first embodiment.

Next, a sequence of fetching a print job in this embodiment will be described with reference to FIGS. 5 and 15A. In this embodiment, the printing apparatus 101 restricts execution of printing by guest users by fetching and executing only print jobs of guest users for each of which a PIN has been set. The sequence in FIG. 15A starts in a state where the printing apparatus 101 has been registered in the CPS 102 through the sequence in FIG. 13A. This procedure is also carried out conforming to IPP. This embodiment will describe the case of immediately fetching a print job after the client terminal has transmitted the print job to the CPS 102 and the CPS 102 has transmitted a job event notification to the printing apparatus 101 in steps S1501 to S1503 in FIG. 15A.

First, the guest user selects the printing apparatus 101 on the client terminal 103 and transmits a print job to the CPS 102 (S1501). Here, a PIN may be, but need not necessarily be, set for the print job. Note that the print job 101 is unable to execute a print job for which a PIN has not been set, as will be described later. The CPS 102 stores the received print job (S1502), and transmits an event notification indicating this print job to the printing apparatus 101 (S1503).

The CPU of the printing apparatus 101 receives, from the CPS 102, the event notification that a print job has been submitted to the CPS 102 (S1503, S501). Next, the CPU of the printing apparatus 101 transmits, to the CPS 102, a "Fetch-job" request operation, which is a job fetch request with a designated job ID to be fetched, as shown in FIG. 6A (S1504, S502). The CPU of the printing apparatus 101 then receives, from the CPS 102, a job fetch response including job data, as shown in FIGS. 6B to 6D (S1505, S503). The CPU of the printing apparatus 101 then checks the job owner name in the response received in step S503 (S1506, S504). The job owner name is identified by, for example, referencing user names in a user information list registered in advance in the MFP, and determines that the job owner is a registered user if a matched user name exists, and determines that the job owner is a guest user if not.

If the job owner is a guest user, the CPU of the printing apparatus 101 determines whether or not a PIN has been set for the received print job, based on the response received in step S503 (S508). Whether or not a PIN has been set is determined based on whether or not the received job data includes a job-password attribute, as shown in FIG. 6D, for example. If a PIN has not been set, the CPU of the printing apparatus 101 cancels fetching of print job data (S1507, S509). If, for example, print job data has already been received, the CPU of the printing apparatus 101 discards this print job data. The CPU of the printing apparatus 101 then transmits, to the CPS 102, "Update-job-status" for notifying the CPS 102 of a job status error, as shown in FIG. 6F (S1508, S510).

If it is determined in step S504 that the job owner is a registered user, or if it is determined in step S508 that a PIN has been set, the CPU of the printing apparatus 101 fetches corresponding print job data from the CPS 102 (S505). The CPU of the printing apparatus 101 then stores the fetched print job data in the storage of the printing apparatus 101 (S1509, S506). The CPU of the printing apparatus 101 then transmits, to the CPS 102, "Update-job-status" for notifying the CPS 102 that the job status is successful, as shown in FIG. 6E (S1510, S507).

As a result, print job data from a registered user who has already been registered in the printing apparatus 101 or print job data with a set PIN of a guest user is stored in the printing apparatus 101, and no other print job data is stored. A procedure for performing printing will be described below with reference to example screens displayed in the user interface of the printing apparatus 101.

A user logs in as a guest user by inputting a user name (user ID) and a password registered as user information associated with the user name to a log-in screen 3A shown in FIG. 3, or touching a guest log-in button (S1511). The job list screen 3B is displayed if the logged-in user is a registered user, and the job list screen 3C is displayed if the logged-in user is a guest user, in response to the logging in. In this embodiment, the print job that was submitted to the CPS 102 and is to be executed by the printing apparatus 101 has already been fetched. Thus, print jobs of the logged-in user, of the print jobs already fetched from the CPS 102, are displayed in the job list. If the logged-in user is a guest user, print jobs of guest users of the CPS 102 are displayed in a list.

Upon a job being selected from the displayed job list screen (S1512), the printing apparatus 101 displays a PIN input screen 3F if the selected job is a print job with a set PIN (S1513). Note that, in FIG. 3, the screen switches to the PIN input screen 3F only from the print job list screen 3C for the guest user, but the screen may also be switched from the list screen 3B to the PIN input screen 3F if the selected job is a job with a set PIN. Upon the user inputting a PIN on this screen (S1514), the PIN set for the print job is checked with the input pin for verification (S1515).

If the verification is successful, printing is performed (S1516). If the verification fails, a screen 3G indicating a failure in PIN verification is displayed, and printing is canceled (S1517). Even if printing is canceled, printing has not begun at this stage. Thus, the printing apparatus 101 outputs a message indicating a failure in PIN verification, and returns to step S1513 to wait for a PIN to be input again. Alternatively, the printing apparatus 101 may return to step S1512 to display the job list screen again, and resume processing from selection of a print job. On the other hand, printing may be executed if PIN verification is successful, or if a PIN has not been set for the print job for which the printing apparatus 101 received a print instruction. A printing-in-progress screen 3D is displayed during printing, and a print completion screen 3E is displayed after the printing has been completed. Note that the printing apparatus 101 of this embodiment does not execute a print job of a guest user for which a PIN has not been set from the CPS 102, and the screen does not directly switch from the print job list screen 3C to the printing-in-progress screen 3D. This applies to the other embodiments.

As described above, in this embodiment, an error is made for a print job whose owner is a guest user and for which a PIN has not been set. This can ensure security for print jobs of guest users as well.

Note that although print job data is fetched in step S505, print job data need not be fetched again in step S505 if the print job fetch response received in step S503 includes the print job data. In this case, in step S505, print job data that has already been received in step S503 and stored in the printing apparatus 101 is fetched.

Second Embodiment

The second embodiment will describe the case of fetching a job at the time of logging in after the client terminal has transmitted a print job to the CPS 102 and the CPS 102 has transmitted a job event notification to the printing apparatus 101 in steps S1501 to S1503 in FIG. 15. Note that the hardware configuration of each device of the second embodiment is the same as the first embodiment. Differences from the first embodiment will be described below.

Upon a user logging in to the printing apparatus 101 (S1518), the printing apparatus 101 transmits a job list fetch request (S1519), and accordingly receives and fetches job list information regarding the logged-in user from the CPS 102 (S1520). The printing apparatus 101 displays a job list based on the fetched job list information (S1521), and the user selects a target print job (S1522).

Figure 7:
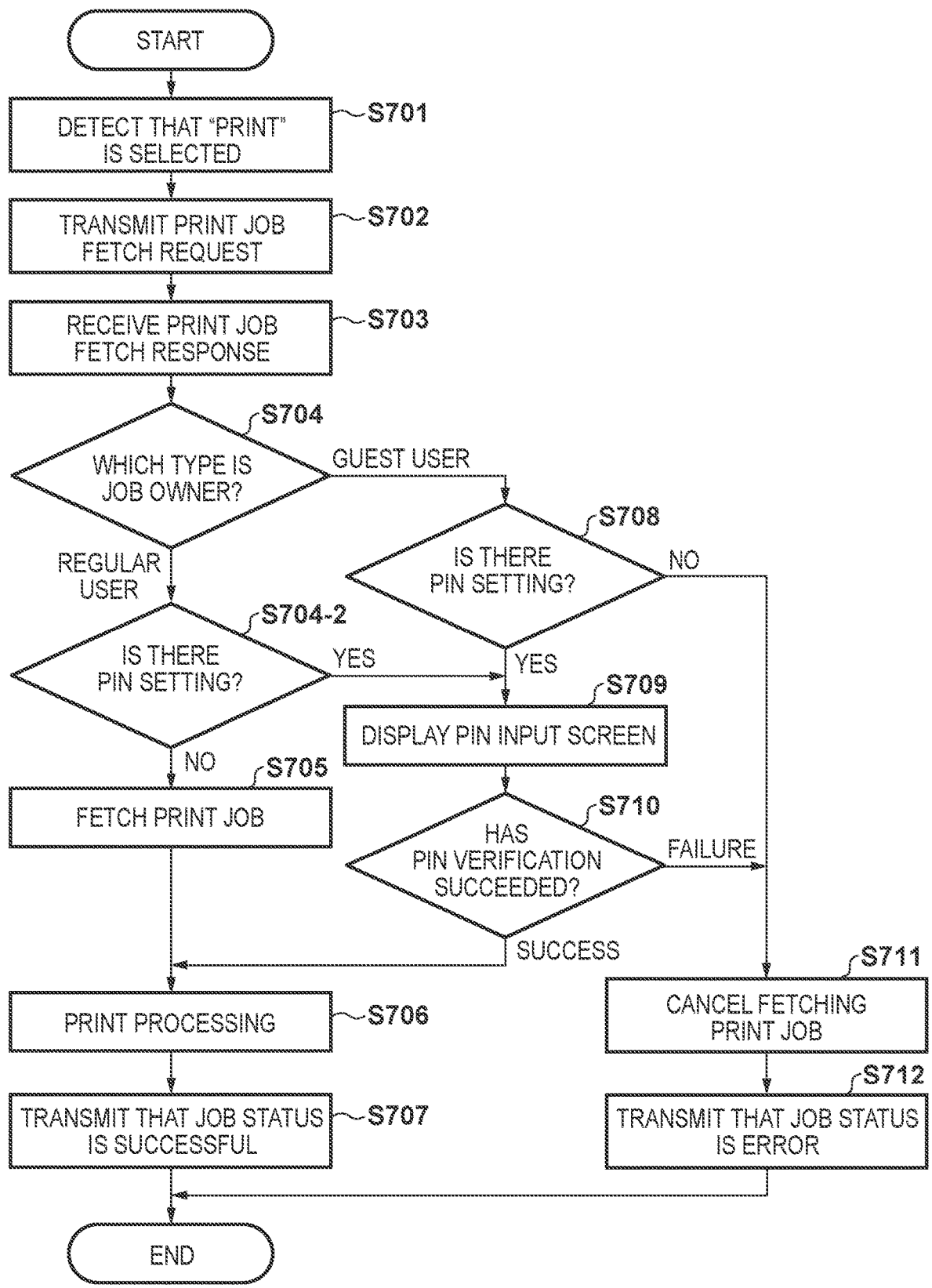
FIG. 7 shows an example of a flowchart when a print job is fetched in a second embodiment.

The processing procedure performed by the printing apparatus 101 of this embodiment shown in FIG. 7 is a procedure performed after the user has logged in, i.e. processing in step S1522 has been completed.

First, the CPU of the printing apparatus 101 detects that printing of a job has been selected (S701). Steps S702 to S704 are the same as steps S502 to S504 of the first embodiment.

In step S704, the printing apparatus 101 determines whether the logged-in user is a registered regular user or a guest user. If the logged-in user is a registered user, the printing apparatus 101 determines whether or not a PIN has been set for the target print job (S704-2). If a PIN has not been set, the printing apparatus 101 fetches the print job in step S705 and performs printing for the fetched print job (S1532, S706). The CPU of the printing apparatus 101 then notifies the CPS 102 of successful job status (S707). If it is determined that a PIN has been set, the processing branches to step S709 and the PIN is verified.

If the logged-in user is a guest user, the printing apparatus 101 determines whether or not a PIN has been set based on the response received in step S703, as in step S508 (S1525, S708). If a PIN has not been set, the printing apparatus 101 cancels fetching of print job data, as in step S509 (S1526, S711). The printing apparatus 101 then notifies the CPS 102 of a job status error, as in step S510 (S1527, S712).

If a PIN has been set, the printing apparatus 101 displays a PIN input screen (S709). The printing apparatus 101 then verifies the input pin (S710). If the PINs match, the processing proceeds to step S706. If the PINs do not match, the processing proceeds to step S711.

As described above, this embodiment makes an error for a job whose owner is a guest user and for which a PIN has not been set, thereby making it impossible for other guest users to execute printing to ensure security.

As described above, this embodiment makes an error for a print job whose owner is a guest user and for which a PIN has not been set. This can ensure security for print jobs of guest users as well. Further, in this embodiment, processing for making an error for a print job whose owner is a guest user and for which a PIN has not been set is performed after the guest user has logged in, thus allowing the guest user to be notified of the processing result. This allows the guest user to understand that the print job could not be fetched since the user has not set a PIN, and then to upload a print job with a set PIN to the CPS 102.

Third Embodiment

The third embodiment will describe the case of registering a guest printing capability and a PIN setting capability as a preset of the printing apparatus 101. FIG. 8 shows an example of a processing procedure when the printing apparatus 101 is registered to the CPS 102. The processing in FIG. 8 may be executed prior to the printer information notification (S1602) in FIG. 13A.

The printing apparatus 101 generates its own capability information (S801). FIGS. 9A and 9B show examples of capability information. FIG. 9A shows an example of capability information generated by a printing apparatus that does not allow guest users to perform printing, and FIG. 9B shows an example of capability information generated by a printing apparatus that allows guest users to perform printing. In step S801, the printing apparatus 101 first creates the capability information shown in FIG. 9A regardless of whether the printing apparatus 101 allows guest users to perform printing. The capability information generated here includes information regarding basic printing capabilities, such as copies, sides, and number-up.

Next, the printing apparatus 101 determines whether or not guest printing is allowed (S802). Whether or not guest printing is allowed may be determined in accordance with a set value of a "allow guest print setting" provided in the printing apparatus, or may be determined in accordance with a setting policy fetched from an external terminal, such as a cloud server. In this embodiment, the printing apparatus 101 also needs to support PIN printing. Thus, the determination as to whether or not guest printing is allowed may be such that it is determined that guest printing is allowed if the allow guest print setting of the printing apparatus is enabled and PIN printing is supported. Needless to say, the determination need not be performed here if whether or not PIN printing is supported is already determined when the allow guest print setting is configured.

If guest printing is not allowed, the CPU of the printing apparatus 101 transmits the generated capability information (information illustrated in FIG. 9A) to the CPS 102 (S803). If guest printing is allowed, print preset information regarding the guest user is added to the capability information generated in step S801, as shown in FIG. 9B (S804). Preset information refers to job-presets-supported, as shown in FIG. 9B. A preset refers to a set of a preset item and a value thereof. In this example, preset information includes a preset name, a password encryption method, and an account type. FIG. 9B shows preset information regarding a preset whose name is Preset1 and indicating that a PIN encrypted with a sha2-256 hash is used if the account type is "guest".

The CPU of the printing apparatus 101 then transmits the added capability information to the CPS 102 (S803).

Printer information including this capability information is provided to the client terminal 103 via the CPS 102. The settings in which the account type is "guest" and a predetermined PIN setting is used are applied to the client terminal 103 that has received the capability information if the client terminal 103 selects the preset whose name is Preset1 received together with the capability information regarding the printing apparatus 101, as shown in FIG. 9B. Thus, if the guest user selects the printing apparatus 101 on the client terminal 103 and selects Preset1, the guest user is required to input a PIN for the target print job. The print job is transmitted to the CPS 102 upon the PIN being input.

By thus preparing a preset with a set PIN, it is more likely that a PIN setting is applied to a print job of a guest user, thereby reducing the risk that another guest user performs printing of the print job and ensuring security.

Fourth Embodiment

The fourth embodiment will describe the case of performing control such that each of the client terminals 103 and 104 determines whether a user operating the client terminal is a registered user or a guest user, and a guest user is required to set a PIN setting.

Figure 12:
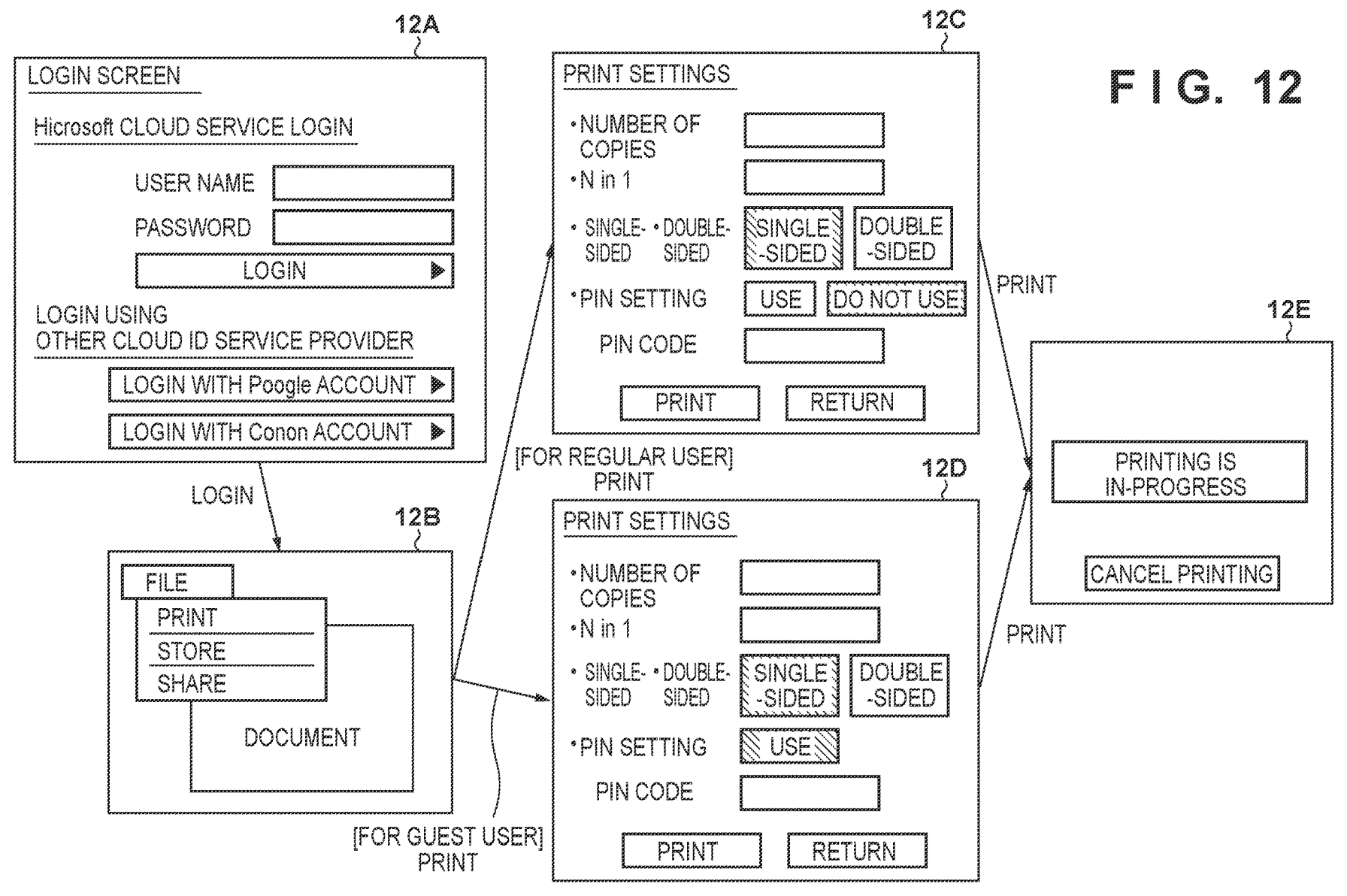

FIG. 10 shows an example of a hardware configuration of the client terminal. The constituent elements have already been described in the first embodiment and are therefore omitted. FIG. 12 shows examples of a user interface when printing is performed from the client terminal 103.

Figure 11:
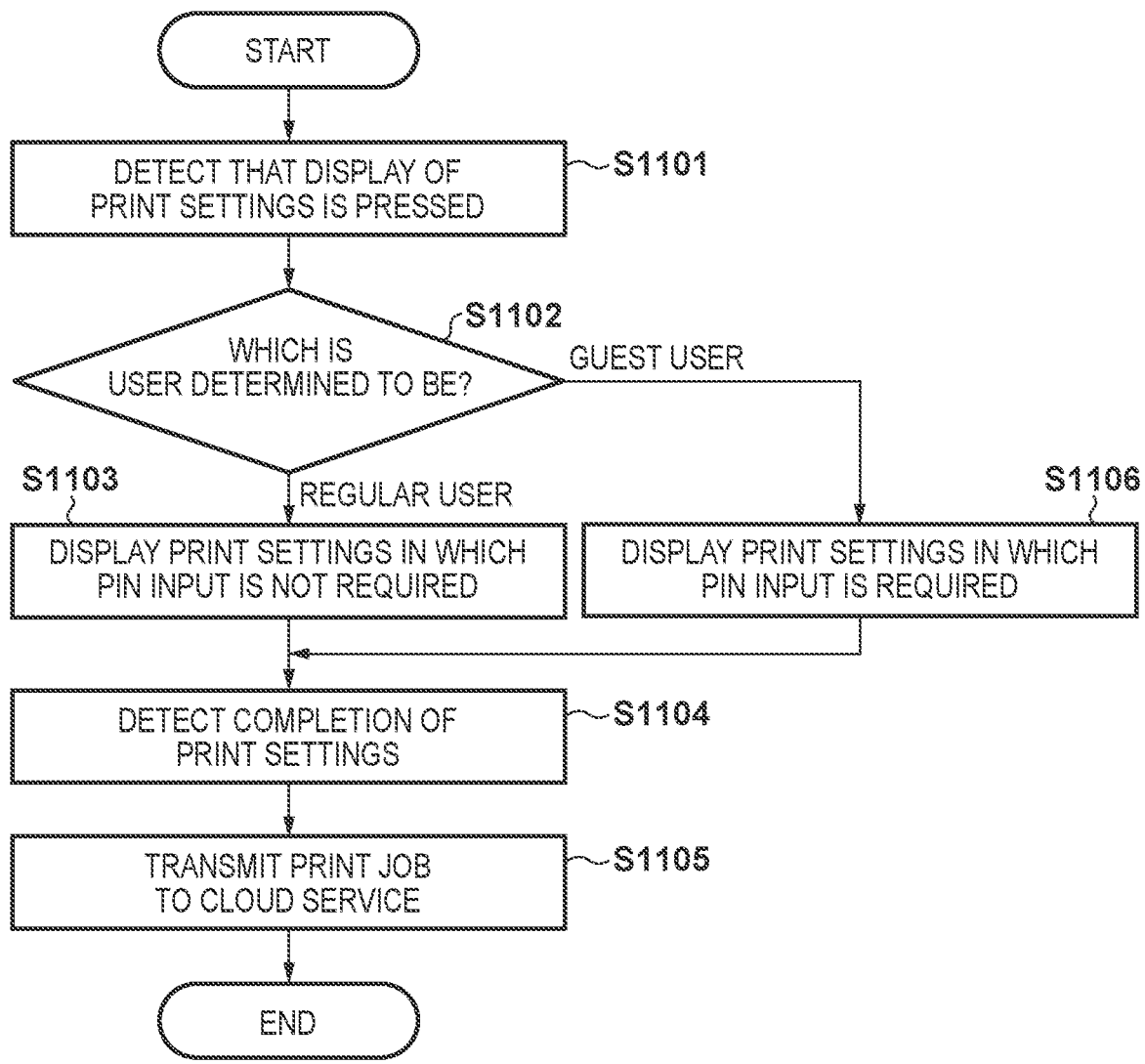
FIG. 11 shows an example of a flowchart for determination about a user according to a fourth embodiment.

This embodiment will be described in accordance with to a control flow of the CPU of the client terminal shown in FIG. 11. First, in step S1101, the CPU 1001 of the client terminal detects that a user has selected "print" with a document open, as shown in any document display screen 12B in FIG. 12, and selected display of print settings. Next, in step S1102, the CPU 1001 determines whether the user who selected display of print settings is a registered user or a guest user of the cloud printing service. The methods for determining whether the user is a registered user or a guest user include, for example, a method of inputting, in advance, a user name and a password for the CPS 102 to the client terminal, as shown in a log-in screen 12A, to log in, and then determining whether the user ID (user identification information) indicates a registered user. A user who is not a registered user has logged in as a guest user, and can thus be identified with this method. Other methods include a method of obtaining the authority to use the CPS 102 using an account on another cloud ID service provider, as shown in the log-in screen 12A, to identify the user as a guest user. Alternatively, a method of performing the determination by transmitting user information to the CPS 102 and receiving, from the CPS 102, a response indicating a registered user or a guest user is also possible.

If it is determined in step S1102 that the logged-in user is a registered user, in step S1103, the CPU 1001 displays a print setting screen 12C in FIG. 12. In this print setting screen, a PIN may be set, but need not necessarily be set. The regular user configures any print settings and presses a "print" button. In step S1104, upon detecting the pressing of the "print" button, the CPU 1001 generates print attribute information based on the configured print settings. In step S1105, the CPU 1001 transmits the generated print attribute information and print data to the CPS 102. If a PIN has been set, the print attribute information includes "Job-password" and "Job-password-encryption" attributes. These attributes are not included if a PIN has not been set.

If it is determined in step S1102 that the logged-in user is a guest user, in step S1106, the CPU 1001 displays a print setting screen 12D. In the print settings here, PIN setting is a required input item. In other words, PIN setting is pre-set to "use", and "do not use" cannot be set. Further, for example, the guest user cannot press the "print" button before inputting a PIN code. Alternatively, the screen is controlled so as to display a message indicating an input error if the "print" button is selected without an input PIN code. The guest user inputs a PIN code and presses the "print" button.

Upon detecting the pressing of the print button in step S1104, the CPU 1001 stores PIN code information in the "Job-password" and "Job-password-encryption" attributes and generates print attribute information. In step S1105, the CPU 1001 transmits the generated print attribute information and print data to the CPS 102. In the case of a guest user, the "Job-password" and "Job-password-encryption" attributes are necessarily included.

This embodiment is based on the premise that the printing apparatus 101 has a PIN setting capability. That is, it is assumed that the client terminal fetches capability information regarding the printing apparatus 101 when creating a printer, and the capability information includes a PIN setting capability attributes, such as "Job-password-supported". If, for example, the capability information regarding the selected printing apparatus does not include the PIN attribute before the print setting screen is displayed in step S1106, an error message indicating that printing cannot be performed with this printing apparatus may also be output. Note that FIG. 12 shows an example where the printing-in-progress screen 12E is displayed, but a messaging indicating that uploading is in progress may be displayed, instead of the printing-in-progress screen 12E, until the uploading of the print job is complete, for example. After the uploading has been completed, a message indicating the completion may also be displayed.

As described above, the client terminal controls the print setting screen so as to always require a guest user to set a PIN, and thus, a PIN is necessarily set for a print job of the guest user. With this, any other guest user who attempts to perform printing of the print job with the printing apparatus does not know the PIN code and is thus unable to perform printing. Security can thus be ensured.

Fifth Embodiment

The fifth embodiment will describe the case where if the CPS 102 receives a print job from a client terminal, the CPS 102 determines whether or not the received print job is from a guest user, and performs control to additionally sets a PIN if the print job is from a guest user and a PIN has not been set for the print job. An example of a hardware configuration of the CPS 102 is the same as that of the client terminal shown in FIG. 10.

Figure 14:
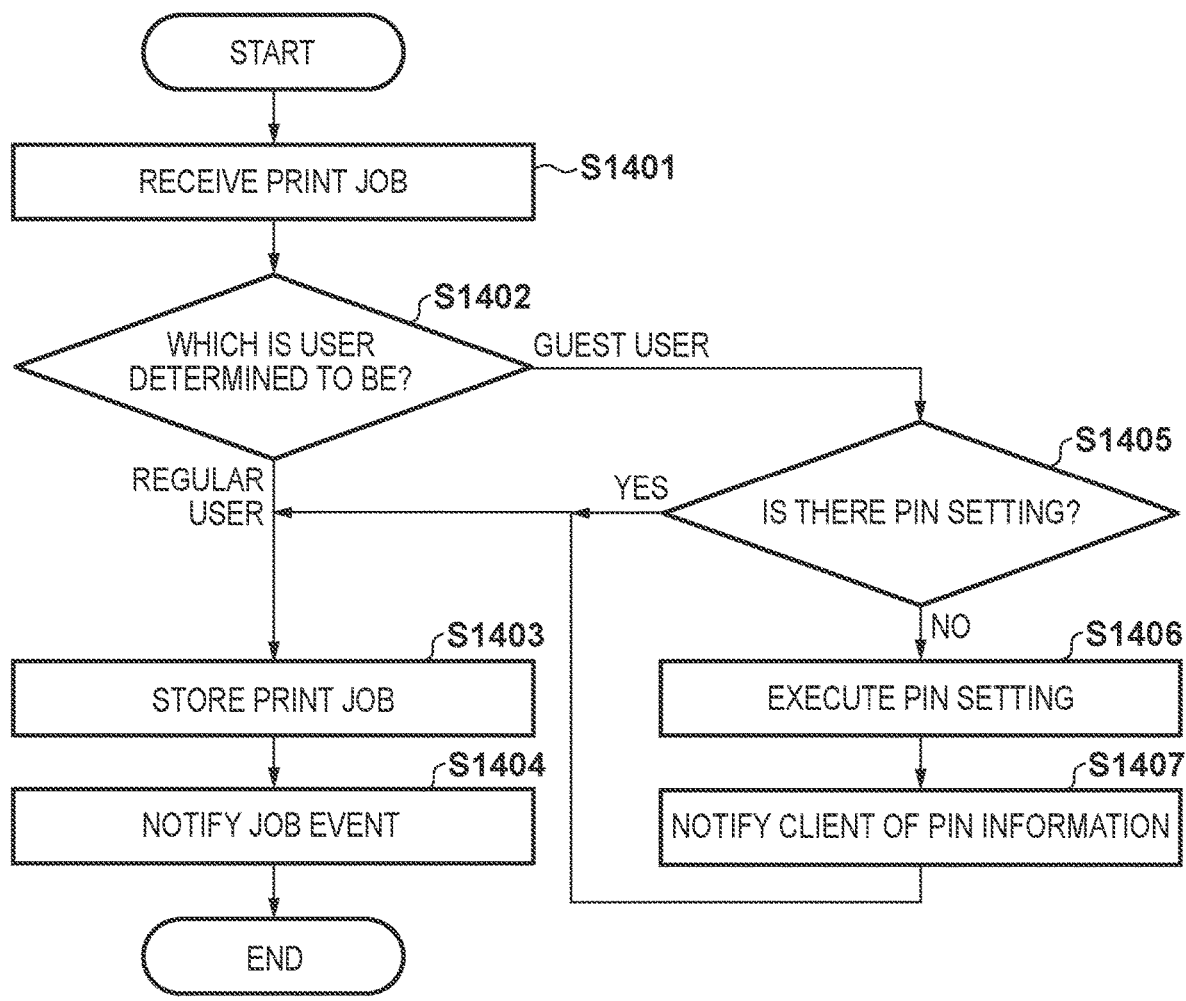
FIG. 14 shows an example of a flowchart for determination about a user in a fifth embodiment.

This embodiment will be described in accordance with a control flow of the CPU 1301 of the CPS 102 in FIG. 14. First, in step S1401, the CPU 1301 detects that a print job has been submitted from the client terminal. After detecting the submitted print job, in step S1402, the CPU 1301 determines whether the job owner of this print job is a registered user or a guest user of the CPS 102. The determination methods include checking whether or not the value of "Job-originating-user-uri" included in print attribute information is included in an account list managed by the CPS 102, for example. Alternatively, the determination may be performed based on any attribute information other than the "Job-originating-user-uri" attribute if the determination can be made using an attribute such as "Requesting-user-uri" or "Job-originating-user-name". Alternatively, whether the job owner is a registered user or a guest user may be determined by performing HTTP authentication or OAUTH authentication when the print job is submitted from the client terminal, rather than based on print attribute information.

If it is determined in step S1402 that the job owner is a registered user of the CPS 102, in step S1403, the CPU 1301 stores the received print data and print attribute information in the storage unit of the CPS 102. In step S1404, the CPU 1301 notifies the printing apparatus 101 that a print job has been received. The printing apparatus 101 may be notified by means of a Get-Notifications operation of IPP, for example.

If it is determined in step S1402 that the job owner is a guest user of the CPS 102, in step S1405, the CPU 1301 determines whether or not the received print attribute information includes a set PIN. Whether or not a set PIN is included is determined based on whether or not attribute information related to the PIN setting, such as "Job-password" or "Job-password-encryption", exists. If it is determined that a set PIN is included, the CPU 1301 determines that there is no problem and proceeds to step S1403.

On the other hand, if it is determined in step S1405 that the print job is of a guest user and a PIN has not been set, in step S1406, the CPU 1301 additionally sets a PIN. For example, the CPU 1301 randomly generates a PIN code, generates attribute information related to the PIN setting, such as "Job-password" and "Job-password-encryption" based on the generated PIN code, and adds the generated attribute information to the received print attribute information. In step S1407, the CPU 1301 notifies the client terminal of the generated PIN code. The notification may be given using any means, such as an e-mail, as long as the guest user can recognize the generated PIN code via the client terminal.

As for a print job for which a PIN has not been set, the printing apparatus to execute this print job does not necessarily support PIN setting. For this reason, before additionally setting a PIN for the print job in step S1406, it may be determined whether or not the printing apparatus 101 to execute the print job has the PIN printing capability, and step S1406 may be executed if the printing apparatus 101 has the PIN printing capability. If it is determined that the printing apparatus 101 to execute the print job does not have the PIN printing capability, the CPU 1301 may transmit an error message indicating this determination result to the client terminal that is the transmission source of the print job and discard the print job.

As described above, even if a print job for which a PIN has not been set is received from the client terminal when the job owner is a guest user, the CPS 102 always additionally sets a PIN. A PIN is thus necessarily set for a print job from a guest user. With this, any other guest user who attempts to perform printing of the print job with the printing apparatus does not know the PIN code and is thus unable to perform printing, Security can thus be ensured.

The printing apparatus 101 of the above embodiment does not execute a print job of a guest user for which a PIN, i.e. a password has not been set. This is because the printing apparatus 101 cancels, i.e. discards a print job of a guest user for which a PIN has not been set, or the client terminal 103 or the CPS 102 sets a PIN for a print job of a guest user. With this, a PIN is set for a print job of a guest user that is to be executed by the printing apparatus 101, thereby preventing the print job from being executed by a user other than the user who has set the PIN, or reducing the chance of such execution of the print job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-093820, filed Jun. 9, 2022 which is hereby incorporated by reference herein in its entirety.

What is claimed is:

1. A printing system comprising:
a printing apparatus comprising at least one memory storing at least one first program, and at least one first processor;
a printing service system connected to the printing apparatus, the printing service system comprising at least one memory storing at least one second program, and at least one second processor; and
an information processing apparatus connected to the printing service system, the information processing apparatus comprising at least one memory storing at least one third program, and at least one third processor,
the at least second program causes the printing service system, when executed by the at least second processor, to perform:
registering the printing apparatus; and
storing a print job received from the information processing apparatus,
the at least third program causes the information processing apparatus, when executed by the at least third processor, to perform:
transmitting, to the printing service system, a print job of a logged-in user in which a printing apparatus selected from among at least one printing apparatus registered in the printing service system is designated,
the at least first program causes the printing apparatus, when executed by the at least first processor, to perform:
storing a user of the printing service system in association with a user of the printing apparatus; and
fetching a print job of a user associated with a logged-in user of the printing apparatus, out of at least one print job stored in the printing service system, and printing,
wherein a guest user of the printing service system is associated with a guest user of the printing apparatus,
the printing apparatus does not execute printing for a print job of the guest user for which a password has not been set, and
the registration registers capability information regarding the printing apparatus, and the capability information regarding printing apparatuses having a capability to execute a print job for which a password has been set includes information indicating the capability.

2. The printing system according to claim 1,
wherein
a password is settable for the print job if the capability information regarding the printing apparatus includes information indicating the capability to execute a print job for which the password has been set.

3. The printing system according to claim 1,
wherein the printing apparatus cancels a print job of the guest user for which the password has not been set, and does not execute printing.

4. The printing system according to claim 3,
wherein the printing apparatus fetches the print job from the printing service system in accordance with a notification that the print job has been transmitted from the information processing apparatus, and cancels the print job of the guest user and does not execute printing if the password has not been set for the print job.

5. The printing system according to claim 4,
wherein if the printing apparatus cancels the print job, the printing apparatus also outputs an error message to the logged-in user.

6. The printing system according to claim 3,
wherein the printing apparatus fetches the print job of a logged-in user in accordance with an operation performed by the logged-in user, and cancels the print job and does not execute printing if the logged-in user is the guest user and the password has not been set for the print job.

7. The printing system according to claim 1,
wherein if the logged-in user is the guest user, the information processing apparatus displays a user interface for having the logged-in user set a password for the print job, and transmits, to the printing service system, the print job for which the password has been set.

8. The printing system according to claim 7,
wherein the information processing apparatus fetches, from the printing service system, capability information regarding the selected printing apparatus, and displays the user interface for having the logged-in user set a password for the print job if the printing apparatus has the capability to execute a print job for which the password has been set, and if the logged-in user is the guest user.

9. The printing system according to claim 8,
wherein the information processing apparatus fetches, from the printing service system, capability information regarding the selected printing apparatus, and outputs a message indicating an error if the printing apparatus does not have the capability to execute a print job for which the password has been set and the logged-in user is the guest user.

10. The printing system according to claim 1,
wherein if the print job received from the information processing apparatus is a print job of a guest user, the printing service system sets a password for the print job and notifies the guest user of the set password.

11. The printing system according to claim 10,
wherein the printing service system sets a password for the print job if capability information regarding the printing apparatus selected for the print job indicates that the printing apparatus has the capability to execute a print job for which the password has been set, and if the print job is a print job of the guest user.

12. The printing system according to claim 11,
wherein the printing service system discards the print job if the capability information regarding the printing apparatus selected for the print job does not indicate that the printing apparatus has the capability to execute a print job for which the password has been set.

13. A printing control method to be performed by a printing system that includes a printing apparatus, a printing service system connected to the printing apparatus, and an information processing apparatus connected to the printing service system, the method comprising:
registering the printing apparatus and storing a print job received from the information processing apparatus, using the printing service system;
transmitting, to the printing service system, a print job of a logged-in user in which a printing apparatus selected from among at least one printing apparatus registered in the printing service system is designated, using the information processing apparatus; and
registering a user of the printing service system in association with a user of the printing apparatus, fetching a print job of a user associated with a logged-in user of the printing apparatus from among at least one print job stored in the printing service system, and executing printing, using the printing apparatus,
wherein a guest user of the printing service system is associated with a guest user of the printing apparatus,
printing is not executed using the printing apparatus for a print job the guest user for which a password has not been set, and
the registering registers capability information regarding the printing apparatus, and the capability information regarding printing apparatuses having a capability to execute a print job for which a password has been set includes information indicating the capability.

14. A printing apparatus which receives, via the Internet, a print job provided by a print service system that received a print instruction from an information processing apparatus, the printing apparatus comprising:
one or more processors; and
at least one memory coupled to the one or more processors and having stored thereon instructions, which when executed by the one or more processors, cause the printing apparatus to:
register capability information of the printing apparatus to the print service system;
receive a print job provided by the print service system that has received the print instruction corresponding to the capability information from the information processing apparatus, and perform printing processing,
wherein the capability information includes information indicating that the printing apparatus is capable of a print job for which a password has been set, and the capability information is registered using an operation of Internet-Printing Protocol (IPP).

15. The printing apparatus according to claim 14, wherein a password entered by a user in the information processing apparatus has been set for the print job, and the printing processing is performed according to that a password corresponding to the password is entered on the printing apparatus.

16. A non-transitory computer-readable storage medium storing thereon a program which, when loaded into a printing apparatus and executed, causes the printing apparatus to execute a process, the process comprising:
registering capability information of the printing apparatus to the print service system;
receiving a print job provided by the print service system that has received the print instruction corresponding to the capability information from the information processing apparatus, and performing printing processing,
wherein the capability information includes information indicating that the printing apparatus is capable of a print job for which a password has been set, and the capability information is registered using an operation of Internet-Printing Protocol (IPP).

17. The non-transitory computer-readable storage medium according to claim 16, wherein a password entered by a user in the information processing apparatus has been set for the print job for which the password has been set, and the printing processing is performed according to that a password corresponding to the password is entered on the printing apparatus.

18. A control method for a printing apparatus, comprising:
registering capability information of the printing apparatus to the print service system;
receiving a print job provided by the print service system that has received the print instruction corresponding to the capability information from the information processing apparatus, and performing printing processing,
wherein the capability information includes information indicating that the printing apparatus is capable of a print job for which a password has been set, and the capability information is registered using an operation of Internet-Printing Protocol (IPP).

19. The control method according to claim 18, wherein a password entered by a user in the information processing apparatus has been set for the print job for which the password has been set, and the printing processing is performed according to that a password corresponding to the password is entered on the printing apparatus.

* * * * *